Figure 1:
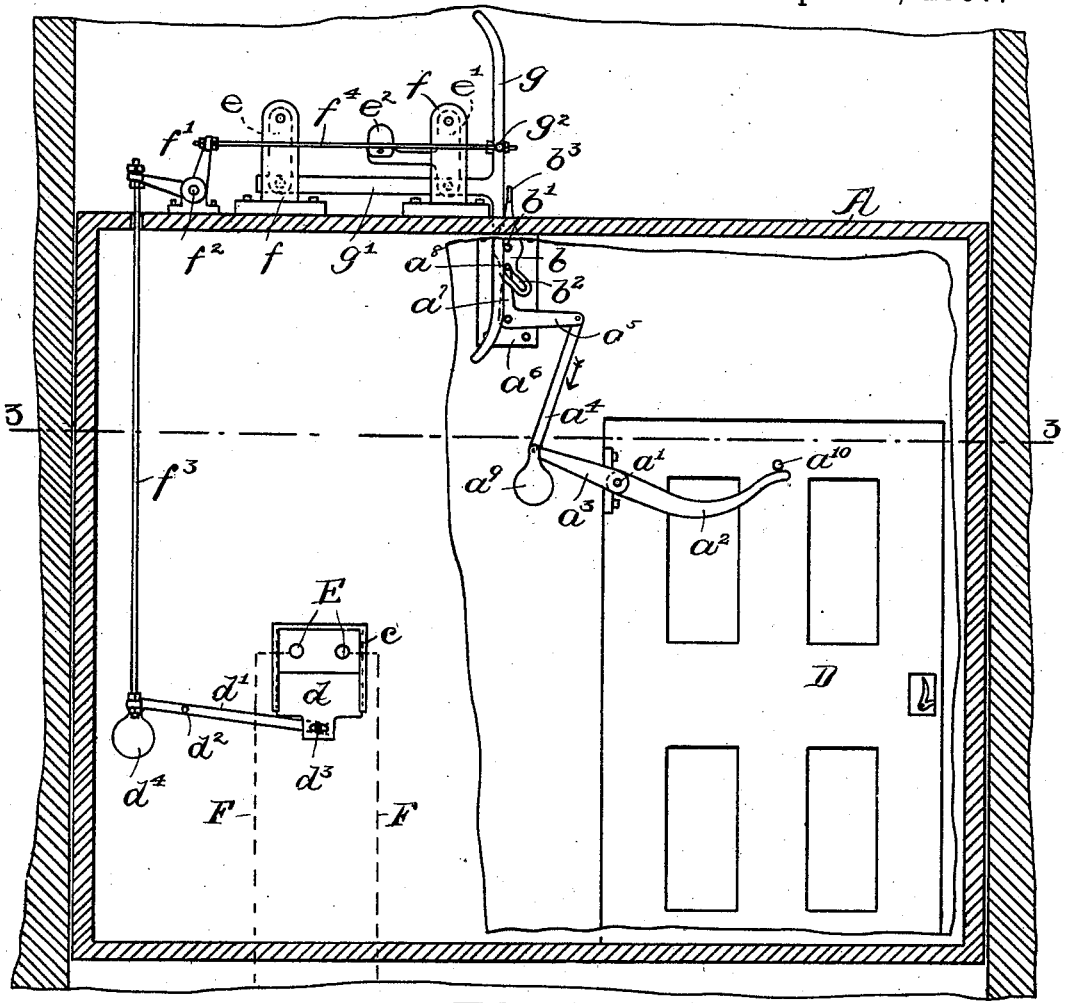

(No Model.) 6 Sheets—Sheet 1.

C. A. HARKNESS.
ELEVATOR.

No. 581,114. Patented Apr. 20, 1897.

WITNESSES.
Matthew M. Blunt.

INVENTOR.
C. A. Harkness
by Knight Brown Quinby
ATTY.

(No Model.) 6 Sheets—Sheet 2.
C. A. HARKNESS.
ELEVATOR.
No. 581,114. Patented Apr. 20, 1897.
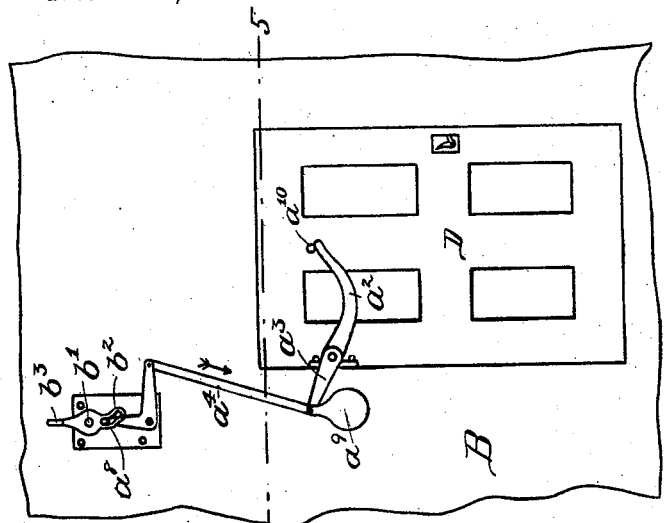
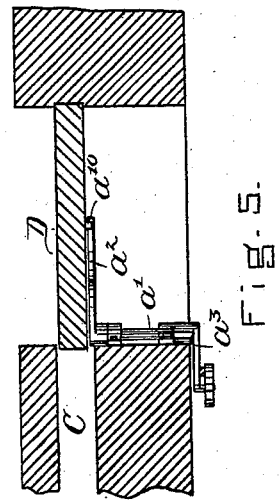
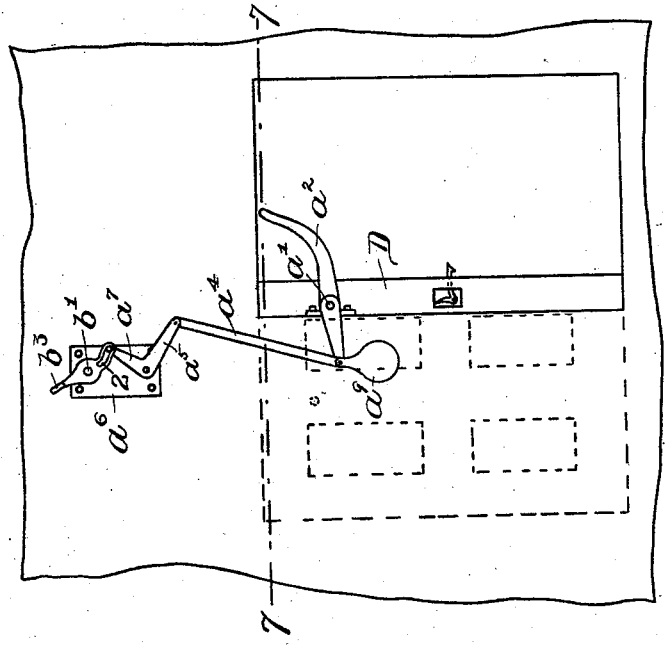
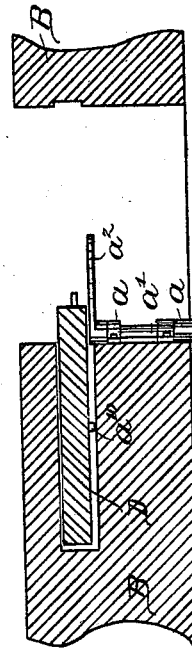
WITNESSES.
Matthew M. Blunt.
INVENTOR.
C. A. Harkness
by Knight Brown & Quinby
ATT'Y.

(No Model.)
6 Sheets—Sheet 3.
C. A. HARKNESS.
ELEVATOR.
No. 581,114.
Patented Apr. 20, 1897.
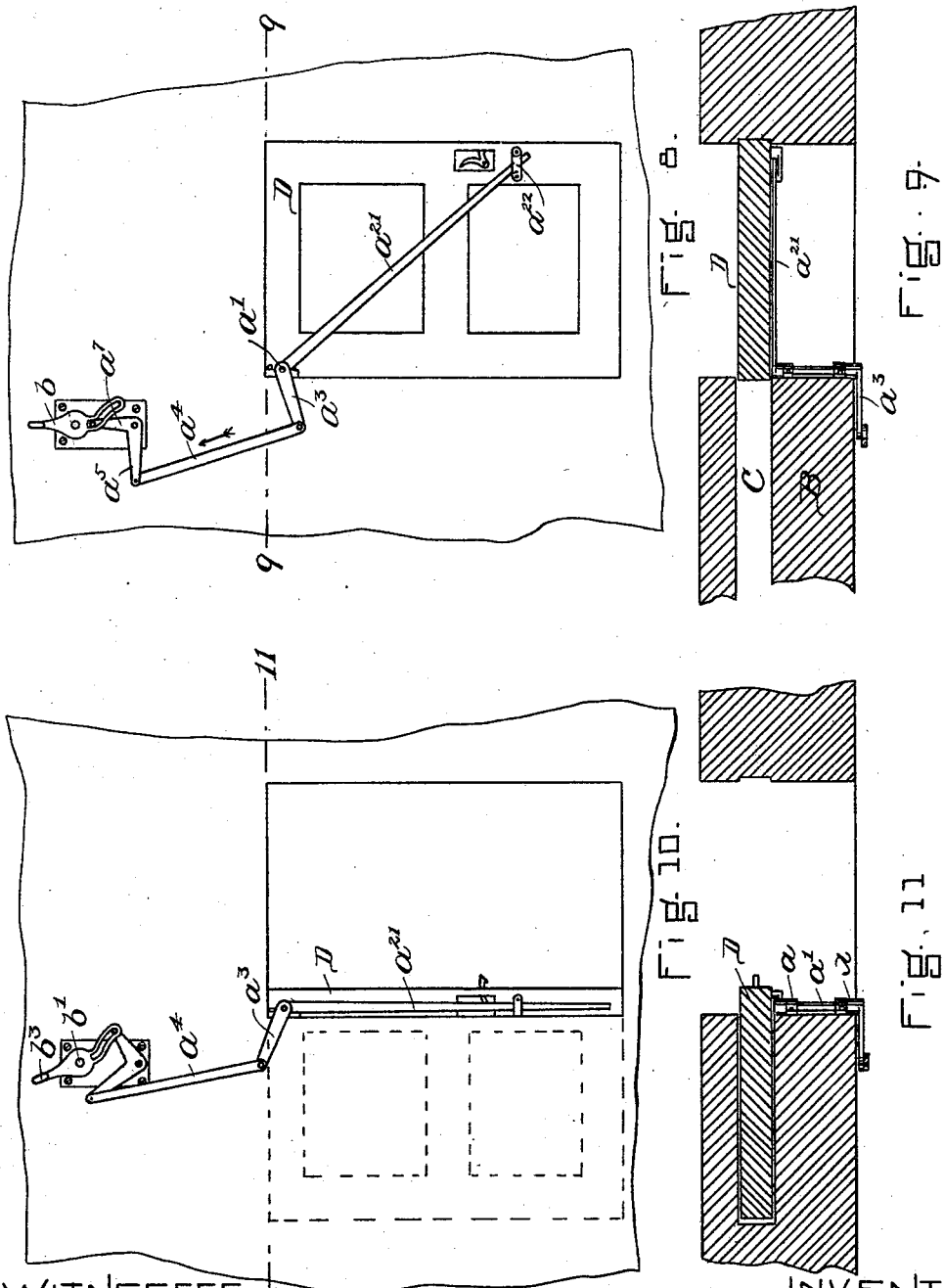
WITNESSES
Matthew M. Blunt.
M. B. May
INVENTOR.
C. A. Harkness
by Wright Brown & Quimby
ATT'Y.

(No Model.) 6 Sheets—Sheet 4.
C. A. HARKNESS.
ELEVATOR.
No. 581,114. Patented Apr. 20, 1897.
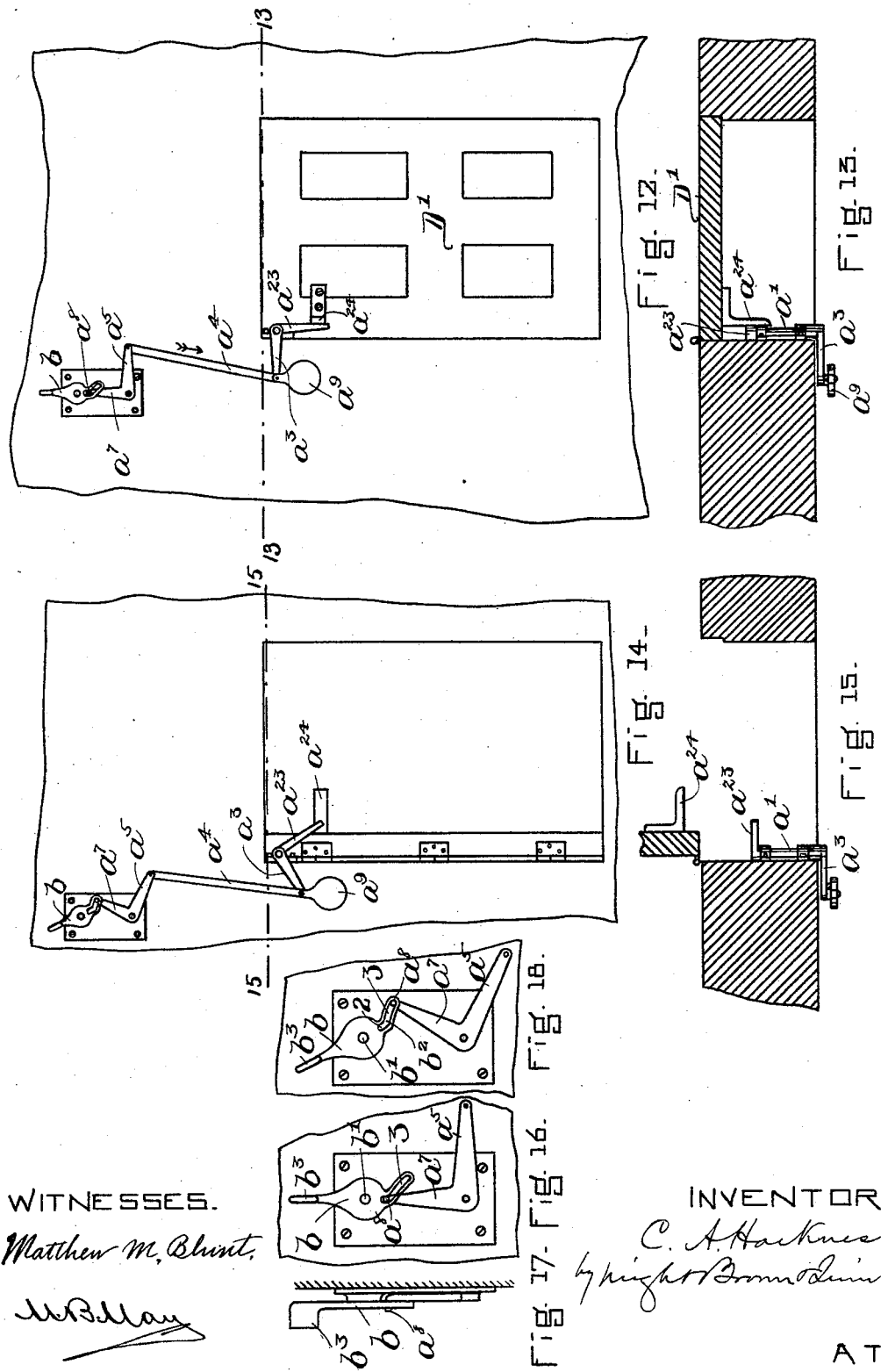

(No Model.)  
6 Sheets—Sheet 5.

C. A. HARKNESS.
ELEVATOR.

No. 581,114. Patented Apr. 20, 1897.

WITNESSES.  
Matthew M. Blunt.

INVENTOR.  
C. A. Harkness  
by Knight Brown & Quinby

ATT'Y (No Model.) 6 Sheets—Sheet 6.
C. A. HARKNESS.
ELEVATOR.
No. 581,114. Patented Apr. 20, 1897.
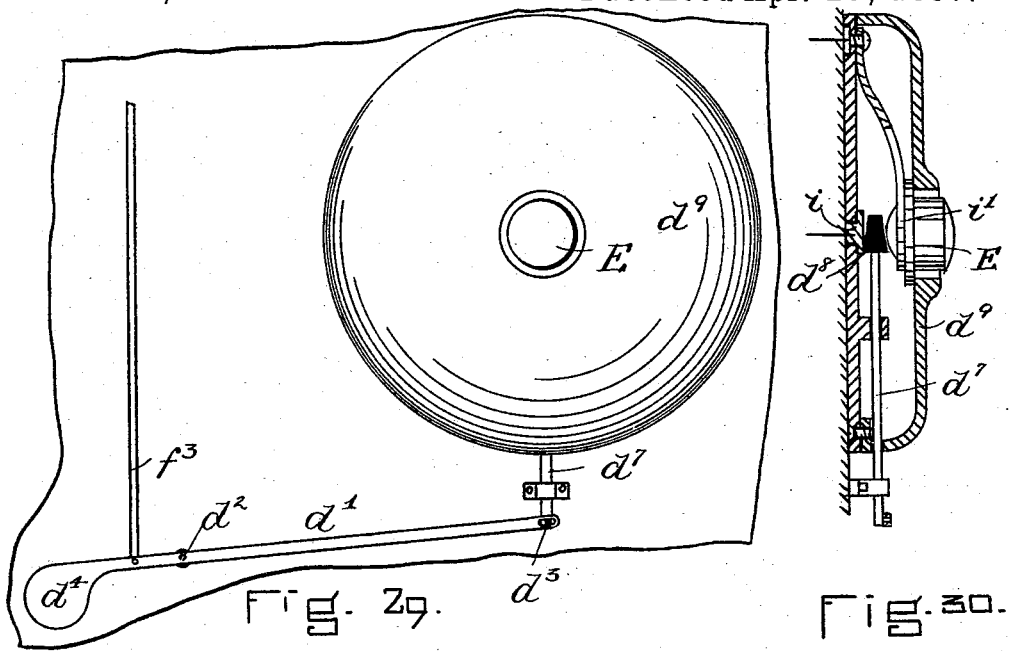
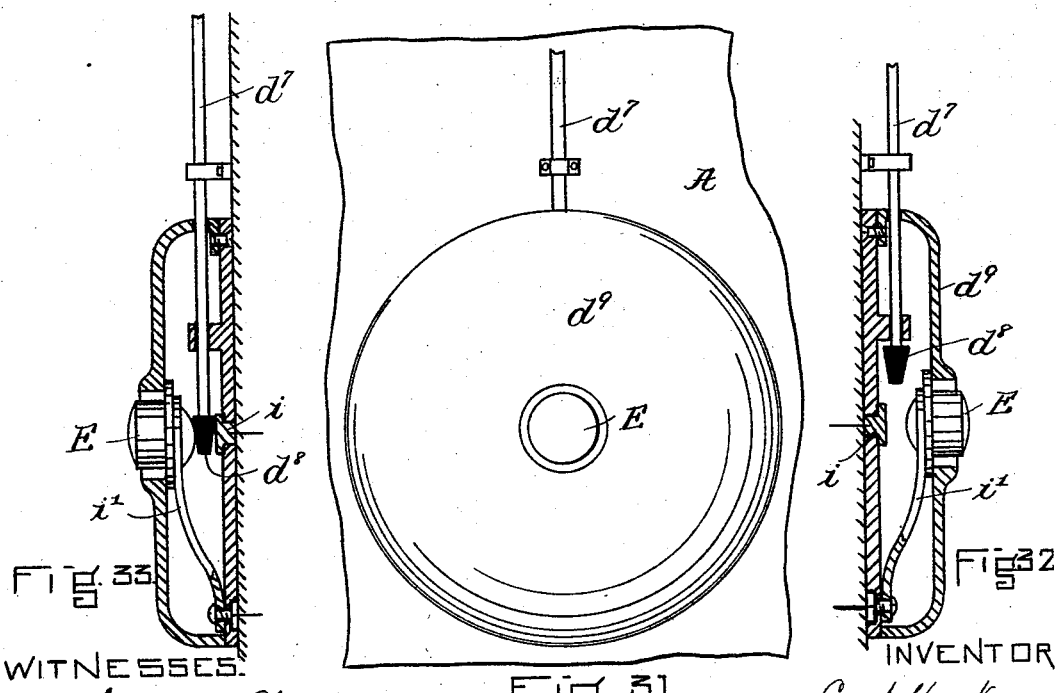
WITNESSES.
Matthew M. Blunt.
INVENTOR
C. A. Harkness
by Knight Brown & Quinby
ATT'Y.

United States Patent Office.

CHARLES A. HARKNESS, OF PROVIDENCE, RHODE ISLAND.

ELEVATOR.

SPECIFICATION forming part of Letters Patent No. 581,114, dated April 20, 1897.

Application filed November 27, 1896. Serial No. 613,479. (No model.)

*To all whom it may concern:*

Be it known that I, CHARLES A. HARKNESS, of Providence, in the county of Providence and State of Rhode Island, have invented certain new and useful Improvements in Elevators, of which the following is a specification.

This invention has relation to elevators of the type employed for carrying passengers between the floors of a building in which an electric system is used for controlling the motor and is designed to accomplish several results.

Of the various objects to be attained by the invention there may be mentioned to reduce the element of danger incident to stepping in and out from an elevator-car by preventing the operation of the devices employed for starting the car-moving motor when the door leading from the corridor into the elevator-shaft is partially or entirely open, whereby the elevator is prevented from starting and is held stationary until the door is closed. Various methods have been proposed for accomplishing this result, and several apparatuses have heretofore been used for locking the hand-operative rope or the lever connected with the rope, but, so far as I am aware, it has never been attempted to prevent the operation of the switches or other electrical devices employed in the car for starting and stopping the car-moving motor. Hence it may be stated that a further and more particular object of the invention is to provide means coacting with the elevator-door, whether it be the door leading from the corridor or the door of the car, to prevent the attendant in the car from operating the electrical switches or buttons when the said doors are partially or entirely open.

Another object of the invention is to provide an apparatus for accomplishing the locking of the hand-operative devices, whether mechanical or electrical, which apparatus may be employed in connection with a door sliding in a pocket in or hinged to what is termed a "fire-wall."

In constructing many of our large buildings it has been the custom to build the wall of the elevator shaft or well of relatively great thickness, so that it is impossible to employ any of the known apparatus for coacting with the door to accomplish the locking of the hand-operative means for controlling the motor on account of the thickness of the wall, a portion of which usually lies between the door when the latter is open and the wall of the car.

Generally where a sliding door is employed in such a wall as above mentioned it operates in a recess or pocket in the wall, the recess being but little greater than the thickness of the door, so as to render it impossible to mount any large part of the apparatus upon the door itself. Hence, as has been previously stated, one of the objects of the invention is to provide an apparatus of the character described, which may be also mounted upon the said fire-wall so as to occupy but little room and have a portion thereof mounted upon the wall or frame of the doorway, so as to be operated by a small projection on the door.

Still another object of the invention is to provide a simple device for insulating from each other the contacts of a press-button, switch, or similar device, so as to prevent their operation at any particular or desired time—such as, for instance, when the door of the corridor or car is open and passengers are entering or leaving the car.

To these ends the invention consists of those devices and apparatus which are illustrated in the drawings and which I shall now proceed to describe in detail and then point out in the claims hereto appended.

Reference is to be had to the accompanying drawings, and to the letters and figures marked thereon, forming a part of this specification, the same letters and figures designating the same parts or features, as the case may be, wherever they occur.

Figure 2:
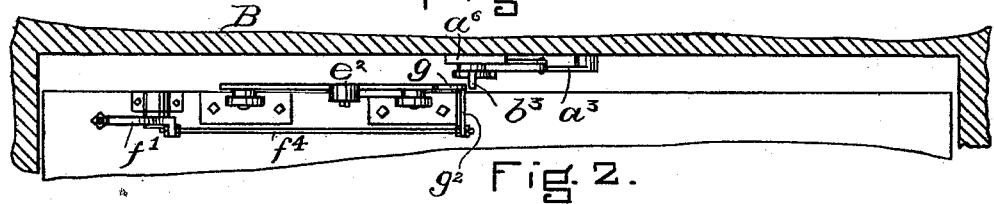
Figure 3:
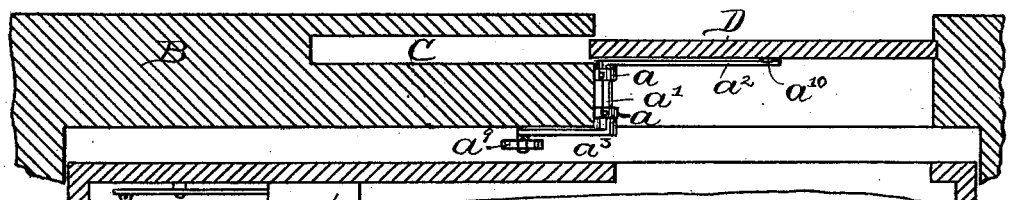
Figure 20:
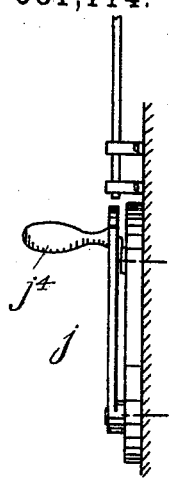
Figure 19:
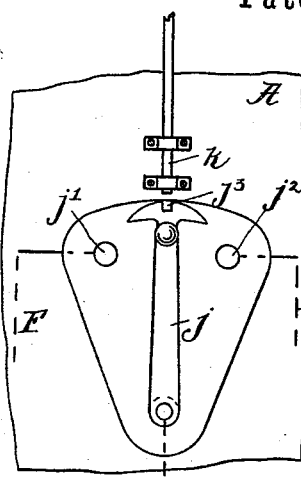
Figure 21:
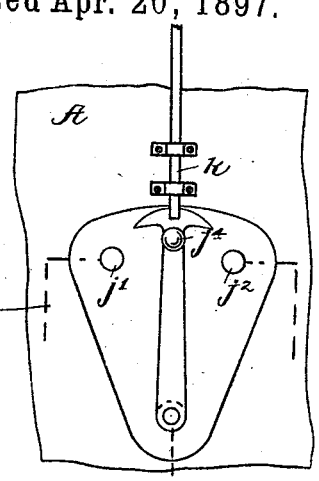
Figure 23:
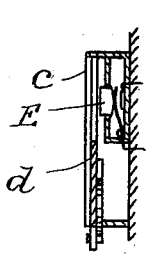
Figures 22, 24:
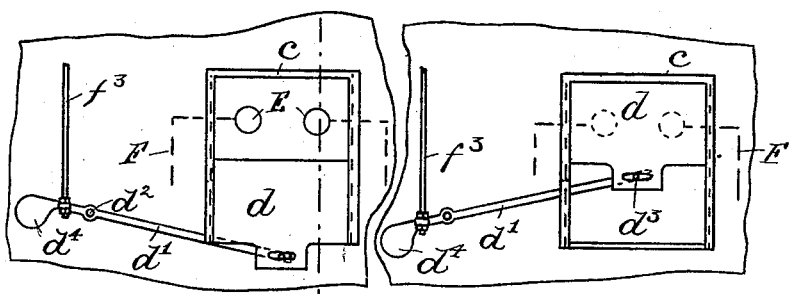
Figure 27:
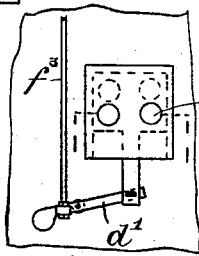
Figures 26, 28:
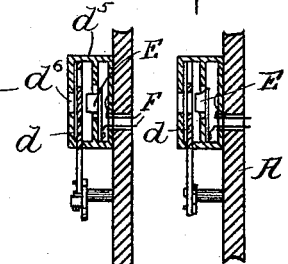
Figure 25:
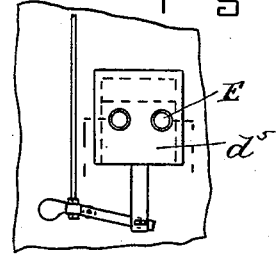

Of the drawings, Figure 1 is a vertical sectional view through a portion of an elevator well or hatchway and an elevator-car suspended therein, also showing the apparatus coacting with the door for shutting off access to the switches or press-buttons on the car, by means of which, in connection with certain electric circuits, the car-moving motor is controlled. Fig. 2 is a plan view of the same, the major portion of the car being broken away for lack of space. Fig. 3 is a sectional view on line 3 3 of Fig. 1. Fig. 4 shows in detail a corridor-door and the apparatus mounted on the wall of the well and coacting therewith for operating a device on the car to prevent the operation of the switches or push-buttons, the door being illustrated as closed. Fig. 5 is a section on line 5 5 of Fig. 4. Figs. 6 and 7 are views similar to Figs. 4 and 5, respectively, but showing the door open. Figs. 8, 9, 10, and 11 are views illustrating a slightly-modified form of apparatus in which the lever pivoted upon the wall of the doorway is operated positively by the sliding door to impart a positive movement to the guard. Figs. 12, 13, 14, and 15 illustrate a horizontally-swinging door and the apparatus which is employed to coact therewith for preventing the operation of the switches or push-buttons on the car. In this embodiment of my invention the movement of the door is not imparted positively to the bell-crank, for the force which moves the latter is yielding and not positive, but I may employ transmitting means for imparting a positive movement from door to said bell-crank lever. Figs. 16, 17, and 18 illustrate a somewhat-enlarged pivoted arm for operating a cross-head on the car and the two-armed lever which rocks it upon its pivot. Figs. 19, 20, and 21 illustrate the manner of locking a pivoted switch-arm to prevent it from being swung so as to engage either of two contacts electrically connected with the car-moving motor. Figs. 22, 23, and 24 illustrate two push-buttons and a guard operated by the devices coacting with the corridor-door for preventing the attendant from actuating either of them. Figs. 25, 26, 27, and 28 illustrate a somewhat similar construction in which the guard slides within a pocket closed except at two apertures in alinement with the press-buttons. Figs. 29, 30, 31, 32, and 33 illustrate devices for insulating the two contacts of an electrical push-button, so as to render the said button inoperative and prevent its being used.

My invention may be applied to an elevator-car which is raised and lowered by a motor of any type, the movements of which are controlled by electrical push-buttons or switches mounted upon the car and connected electrically with the motor.

The car (indicated by A) travels up and down the elevator well or hatchway, the front wall B of which is of a relatively great thickness and is provided with a recess or pocket C, in which the door D is adapted to slide.

The pocket C of the wall B is slightly greater than the door D, so that the latter fits snugly therein when the door is open. Heretofore it has been practically impossible to employ an apparatus in connection with a door sliding in this way in a fire-wall, so as to prevent the actuation of the operative devices on the car which control the motor, on account of the very fact of the snug fit of the door in the pocket.

As shown in the drawings, I mount in bearings $a\ a$ on the wall of the doorway a rock-shaft $a'$, equipped on its outer end with a curved lever $a^2$, extending partially across the doorway, as shown in Fig. 1, but high enough above the floor to permit passengers to pass thereunder. The inner end of the shaft $a'$ is provided with an arm or lever $a^3$, which is pivoted to a link $a^4$, in turn pivoted to the outwardly-projecting arm $a^5$ of a bell-crank lever pivoted upon the inner face of the wall B to a plate or bracket $a^6$. The said bell-crank lever has an upwardly-extending arm $a^7$, on the outer end of which is a projecting pin $a^8$. A weight $a^9$, pivoted to the lever $a^3$ and the link $a^4$ at their connecting ends, draws downward upon the said parts, so as to throw the arm $a^7$ of the bell-crank lever to the right. The weight is prevented, however, from accomplishing this, when the door is closed, by means of a small roller $a^{10}$, projecting from the door and bearing upon the curved end of the said lever $a^2$. When the door is being opened and the roller travels to the left, it allows the weight $a^9$ to depress the arm $a^3$ and the arm $a^5$ of the bell-crank lever and to throw the arm $a^7$ of the said bell-crank lever to the right. Just above the pivot-pin of the said bell-crank lever $a^5$ and $a^7$ is a rocking lever $b$, pivoted at $b'$ to the said plate $a^6$ and having in its lower end a peculiarly-shaped slot $b^2$. By examining Figs. 16, 17, and 18 it will be seen that the slot has a short straight portion 2 and a curved portion 3, which is an arc of a circle struck from the pivot-pin of the bell-crank lever as a center. The pin $a^8$ of the lever $a^7$ slides in said slot, and at the first movement of the door toward open position it bears against the side walls of the straight portion 2 of the slot in the pivot-lever $b$ and swings the upper end $b^3$ to the left until the said pin enters the curved portion 3 of the slot, and as the door continues its movement the pin $a^8$ travels in the curved portion of the slot without effecting further movement of the pivot-lever $b$, though preventing it from being thrown to the right.

The upper end of the lever $b$ is bent so as to project forward from the wall, and it is arranged to impinge against a movable member on the car for cutting off access to or preventing the operation of the switches or push-buttons or other operative devices upon the car which are used for controlling the movements of the motor.

In Fig. 1 I have illustrated somewhat conventionally two push-buttons E E, each of which is arranged in a circuit indicated conventionally at F F. By properly manipulating the buttons the motor may be controlled in such way as to move the elevator-car up or down or bring it to a state of rest. The push-buttons E E are placed in a casing $c$, in which is adapted to slide a shield or guard $d$, (see also Figs. 22, 23, and 24,) which guard constitutes means for preventing the operation of the push-buttons or electrical devices on the car. The said shield or guard is normally dropped below the push-buttons, so as to expose them to access, as shown in Fig. 22, but it may be raised, as shown in Fig. 24, by devices mounted on the car and coacting with the pivoted lever $b$.

The lever $d'$ is pivoted on the interior face of one of the side walls of the car by a pivot-pin $d^2$ and its longer end is provided with a pin $d^3$, projecting into a slot in the guard or shield. The smaller and outer end of the lever $d'$ is equipped with a weight $d^4$ sufficiently large to counterbalance the weight of the guard or shield $d$ and render it more easy to lift it, so as to cover the push-buttons E.

Pivoted to the lower ends of two links $e$ $e'$, each of which is hung upon the upper end of a bracket $f f$ upon the top of the car, is a laterally-extending arm $g'$ of a cross-head $g$, the latter lying in a parallel plane to the side of the car, as shown in Fig. 2. The link $e'$ is provided with a laterally-projecting weighted arm $e^2$, which arm is sufficient to overcome the downward tendency of the weight $d^4$ and to hold the cross-head $g$ forward. The bell-crank lever $f'$ is pivoted at $f^2$ upon the top of the car and has one arm connected with the smaller end of the lever $d'$ by a link or rod $f^3$ and another arm connected by a link or rod $f^4$ to an arm $g^2$, projecting rearwardly from the cross-head $g$. The cross-head and the other parts of the apparatus on the car are so arranged that as the car travels up and down in the elevator well or hatchway the cross-head $g$ just escapes the upper end $b^3$ of the rocking or pivoted lever $b$, when the latter is in the position which it is caused to assume when the door D is closed.

Assuming that the car in its movements has reached a position when its floor is in alinement with the floor of the corridor and that the attendant has stopped the car at that point, when the door is opened, the lever $a^2$ rides upward, the weight $a^9$ drawing down upon the bell-crank lever $a^5$ $a^7$, so as to throw the upper end $b^3$ of the pivoted lever $b$ to the left. The said end $b^3$ engages the cross-head $g$ and swings it back, so as to throw the weight $d^4$ downward and draw down upon the shorter end of the lever $d'$ and force the shield or guard $d$ upward in its guides so as to cover the buttons E and prevent the attendant from actuating them. The parts will be held in this position until the door is fully closed and the cross-head $g$ is allowed to swing forward to its normal inoperative position. The movement of the cross-head is imparted positively to the guard, as illustrated, by the links and levers hereinbefore described, but it will be understood that the parts may be so arranged as to allow the weight $d^4$ to move the guard, in which case the movement of the cross-head will be imparted yieldingly to the said guard. This may be accomplished by removing the nut from the link $f^3$ just below the horizontal arm of the bell-crank lever $f'$.

It will be understood that my invention is not limited to the details of construction which I have just described, as it may be embodied in other devices and in other constructions. For instance, in Figs. 8 to 11, inclusive, I have shown a lever $a^{21}$, which is swung positively to and fro by the door, its lower end passing between guides $a^{22}$ thereon. The upper end of the lever $a^{21}$ is connected to the shaft $a'$ rigidly, so as to rock it, and in which case the movement of the door is imparted positively to the guard. Again, my invention is applicable to swinging doors, such as illustrated in Figs. 12 to 15, inclusive. I employ the shaft $a'$ and secure rigidly thereto upon its outer end a lever $a^{23}$, which is held to the left, so as to overcome the weight $a^9$ by a clip or projection $a^{24}$ on the swinging door D'. When the door is closed, the projection $a^{24}$ presses against the lever $a^{23}$ and holds the rocking arm $a'$ in its inoperative position, but when the door is swung open on its hinges, the arm $a^{23}$ is freed and the weight $a^9$ throws the upper end $b^3$ of the lever $b$ forward so as to operate the cross-head $g$ and cause the actuation of the means or devices on the car for preventing access to or the operation of the electrical switches or push-buttons on the car.

In Figs. 25 to 28, inclusive, I have shown a guard or shield $d$ as sliding in guides within a box $d^5$, having its front closed except for two apertures $d^6$, through which the fingers may be passed to operate the push-buttons E. When the door is closed, the guard $d$ is in its lowest position, and when the door is partially or entirely open the guard is thrust up, so as to prevent the operation of the push-buttons.

In Figs. 29 to 33, inclusive, I have illustrated a guard for preventing the operation of the push-buttons, which consists of a small rod $d^7$, equipped with an insulated end $d^8$, which when the door is opened is thrust between the contact $i$ and the movable contact $i'$, which is adapted to be pressed inward by the button E.

In Figs. 29 and 30 the rod $d^7$ is shown as being thrust upward to effect the insulation of the movable and stationary contacts of the push-buttons, and in Figs. 31 to 33 I have shown the rod as being thrust downward to accomplish this purpose. The push-button E is mounted in a casing $d^9$ of any suitable character and the contact $i$ is connected with one line of the electrical circuit and the movable contact $i'$ is connected to the other line of the said circuit.

Of course I do not limit myself to the employment of push-buttons, as I may prevent the operation of any other electrical device, such as a movable switch, when the door is closed.

In Figs. 19, 20, and 21 I have shown a switch mechanism consisting of a lever $j$, connected with one limb of a circuit and adapted to be moved so as to press against either one of two contact-points $j'$ $j^2$ to start the car-moving motor in either direction. In this event, instead of employing the particular form of guard or shield above described, which, however, may be employed, if so desired, I use a different form of guard consisting, in this case, of a rod $k$, which is connected with the bell-crank lever $f'$ and which, when the door is open, will drop into a socket $j^3$ in a switch-lever $j$, so as to prevent the operation of the lever while the door is open. The said lever may be equipped with a handle $j^4$ and may be of any style or type desired.

I have shown the above-described devices only for the purpose of illustrating simple embodiments of my invention, and I may change said devices to suit any particular style or class of electrically-controlled elevators or to suit any particular requirements.

So far as the mechanism which is mounted on the wall of the well is concerned, I do not limit myself to its employment in connection with means for preventing access to or the operation of electrical push-buttons or switches, as I may employ it in connection with devices for locking a hand-lever on the car, by means of which a controlling-rope is shifted to regulate the movements of the motor-controlling mechanism.

By the employment of my apparatus, which, as illustrated and described, is mounted upon the wall of the well, so as to be used with a door suitable for a fire-wall, it is to be observed that it is unnecessary to cut away part of the wall, as it may be adapted to coact with a door of any character now in use without changing the door or wall or reconstructing any of the adjuncts thereof.

By providing the rock-shaft, which is mounted in the doorway and extends from the door to the face of the wall, I am enabled to employ the remainder of the mechanism in buildings when the walls are of different thicknesses, since the shaft may be short or long to suit the particular wall on which it is to be mounted.

I have shown two different forms of apparatus for preventing the actuation of the electrical devices on the car which control the movements of the motor, whereby the door causes a positive actuation of the guard, as in Fig. 8, or whereby its movement is yieldingly transmitted to the guard, as in Fig. 1, in which case the actuation of the guard is effected by the weight $a^9$ and not directly by the door, as in Fig. 8. Both of these apparatus have their peculiar advantages and are adapted to be employed to meet different requirements.

It will be understood that by my invention any manipulation of the push-buttons or switches is prevented, for although it does not operate to break the circuit connecting the buttons or switches with the motor-controlling mechanism, yet it prevents the attendant from pressing the button or shifting the switch to start the car. Hence when I employ the term "manipulation" I mean that while the button or switch is still in circuit with the motor-controlling mechanism it is guarded against being moved with the hands, while by stating that the "actuation" of button or switch is prevented I mean, broadly, that the motor-controlling mechanism cannot be actuated by the attendant.

I do not herein claim, specifically, the sliding shield or guard for covering the push-buttons, as it forms the subject-matter of a claim in my copending application, Serial No. 613,480, filed November 27, 1896.

Having thus explained the nature of the invention and described a way of constructing and using the same, though without attempting to set forth all of the forms in which it may be made or all of the modes of its use, it is declared that what is claimed is—

1. In an elevator, a car, an electric push-button device on the car for electrically controlling the movements of the motor, a movable door, and means coacting with the door for preventing the manipulation of said electric device when said door is partially or entirely open.

2. In an elevator, a car, an electric push-button device on the car for electrically controlling the movements of the motor, a movable door having devices for transmitting the movements thereof, and means mounted on the car and coacting with the last-mentioned devices, for preventing the manipulation of said electric push-button device when said door is partially or entirely open.

3. In an elevator, a car, an electric push-button on the car for electrically controlling the movements of the motor, a movable door, and mechanical means coacting with the door for preventing the manipulation of said electric push-button when said door is partially or entirely open.

4. In an elevator, a car, an electric push-button on the car for electrically controlling the movements of the motor, a movable door, mechanical means mounted in the car for preventing the actuation of said electric push-button, and mechanism operated by said door for actuating said mechanical means.

5. In an elevator, a car, an electric push-button on the car for electrically controlling the movements of the motor, a movable door, means mounted on the car for preventing the actuation of said electric push-button, and mechanism mounted on the wall of the well and coacting with said door to operate said means when the door is partially or entirely open.

6. In an elevator, a car, an electric device on the car for electrically controlling the movements of the motor, a movable door, and a movable guard operated by the opening of said door for preventing the actuation of said electrical device when said door is partially or entirely open.

7. In an elevator, a car, an electric device on the car for electrically controlling the movements of the motor, a movable door having devices for transmitting the movement thereof, a movable guard for preventing the actuation of said electrical device, and a crosshead mounted on the car and coacting with said devices for transmitting the movements of the door for operating said guard when the said door is partially or entirely open.

8. In an elevator, a car, an electric device on the car for electrically controlling the movements of the motor, a movable door, a movable guard for preventing the actuation of said electrical device, a cross-head mounted on the car and connected to said guard, and movable means mounted on the wall of the well and coacting with said door to operate the cross-head and thereby the guard when the door is partially or entirely open.

9. In an elevator, a car, an electric device on the car for electrically controlling the movements of the motor, a movable door, a sliding guard mounted on the wall of the car to prevent the actuation of said electrical device, a weighted cross-head connected with the guard and mounted on the car for operating said guard, and an arm mounted upon the wall of the well and coacting with said door for operating the cross-head when the door is partially or entirely open.

10. In an elevator, a movable door, a device on the car having two normally-separated contacts which are in circuit with means for controlling the motor, and means coacting with the door for insulating said contacts when said door is partially or entirely open.

11. In an elevator, a motor-controlling device on the car in circuit with the motor-controlling mechanism, and two normally-separated contacts, one of which may be moved by force to touch the other to complete the circuit, a door and insulating means, coacting with said door and adapted to be temporarily inserted between said contacts to prevent one from being moved into contact with the other, whereby the car may be held stationary when the door is partially or entirely open.

12. In an elevator, a car, a device adapted to be operated by the attendant for controlling the movements of the motor, means on the car for preventing the actuation of said device, a door, a pivoted arm mounted on the wall of the well and adapted to engage said means on the car, a bell-crank also mounted on said wall for operating said pivoted arm, and means coacting with said door for actuating said bell-crank when said door is partially or entirely open.

13. In an elevator, a car, a device adapted to be operated by the attendant for controlling the movements of the motor, means on the car for preventing the actuation of said device, a door, a pivoted arm mounted on the wall of the well and adapted to engage said means on the car, a bell-crank also mounted on said wall for operating said pivoted arm, a rock-shaft connected to said bell-crank to actuate it, and means coacting with the door for rocking said shaft.

14. In an elevator, a car, a device adapted to be operated by the attendant for controlling the movements of the motor, means on the car for preventing the actuation of said device, a door, levers on the wall of the well to actuate said means, and a rock-shaft mounted in the doorway and extending from the door to the face of the wall and connected to said levers, for operating them, said rock-shaft coacting with said door in its movements.

15. In an elevator, a car, a device adapted to be operated by the attendant for controlling the movements of the motor, means on the car for preventing the actuation of said device, a door, and mechanism for actuating said means comprising operative levers pivoted on the wall of the well, and a rock-shaft mounted in the doorway and extending from the door to the face of the wall, said rock-shaft being connected with said levers, and being provided with an arm coacting with the door.

In testimony whereof I have signed my name to this specification, in the presence of two subscribing witnesses, this 24th day of November, A. D. 1896.

CHARLES A. HARKNESS.

Witnesses:
MARCUS B. MAY,
C. C. STECHER.